(12) United States Patent
Berry et al.

(10) Patent No.: US 9,126,833 B2
(45) Date of Patent: Sep. 8, 2015

(54) METHOD FOR CONTINUOUS SYNTHESIS OF METAL OXIDE POWDERS

(71) Applicants: David A. Berry, Mt. Morris, PA (US); Daniel J. Haynes, Morgantown, WV (US); Dushyant Shekhawat, Morgantown, WV (US); Mark W. Smith, Morgantown, WV (US)

(72) Inventors: David A. Berry, Mt. Morris, PA (US); Daniel J. Haynes, Morgantown, WV (US); Dushyant Shekhawat, Morgantown, WV (US); Mark W. Smith, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 14/296,643

(22) Filed: Jun. 5, 2014

(65) Prior Publication Data

US 2014/0363365 A1    Dec. 11, 2014

Related U.S. Application Data

(60) Provisional application No. 61/831,251, filed on Jun. 5, 2013, provisional application No. 61/831,256, filed on Jun. 5, 2013.

(51) Int. Cl.
*C01B 13/00* (2006.01)
*C01B 13/34* (2006.01)

(52) U.S. Cl.
CPC ............ *C01B 13/34* (2013.01); *C01P 2004/03* (2013.01); *C01P 2004/32* (2013.01); *C01P 2004/62* (2013.01)

(58) Field of Classification Search
None
See application file for complete search history.

(56) References Cited

U.S. PATENT DOCUMENTS

| | | | |
|---|---|---|---|
| 3,330,697 A | 7/1967 | Pechini | |
| 6,482,387 B1 * | 11/2002 | Gulgun et al. | ............ 423/593.1 |
| 6,559,103 B1 * | 5/2003 | Kirkwood et al. | ............ 505/430 |
| 7,220,398 B2 | 5/2007 | Sutorik et al. | |
| 8,187,562 B2 | 5/2012 | Chang et al. | |

OTHER PUBLICATIONS

Boldrini et al., "Influence of Microwave-Assisted Pechini Method on La0.80Sr0.20Ga0.83Mg0.17O3 Ionic Conductivity," Fuel Cells 12, No. 1 (2012).
Rudisill et al., "Controlling Microstructural Evolution in Pechini Gels through the Interplay between Precursor Complexation, Step-Growth Polymerization, and Template Confinement," Chem. Mater. 25 (2013).

* cited by examiner

*Primary Examiner* — Steven Bos
(74) *Attorney, Agent, or Firm* — James B. Potts; Brian J. Lally; John T. Lucas

(57) ABSTRACT

A method for the rapid and continuous production of crystalline mixed-metal oxides from a precursor solution comprised of a polymerizing agent, chelated metal ions, and a solvent. The method discharges solution droplets of less than 500 μm diameter using an atomizing or spray-type process into a reactor having multiple temperature zones. Rapid evaporation occurs in a first zone, followed by mixed-metal organic foam formation in a second zone, followed by amorphous and partially crystalline oxide precursor formation in a third zone, followed by formation of the substantially crystalline mixed-metal oxide in a fourth zone. The method operates in a continuous rather than batch manner and the use of small droplets as the starting material for the temperature-based process allows relatively high temperature processing. In a particular embodiment, the first zone operates at 100-300° C., the second zone operates at 300-700° C., and the third operates at 700-1000° C., and fourth zone operates at at least 700° C. The resulting crystalline mixed-metal oxides display a high degree of crystallinity and sphericity with typical diameters on the order of 50 μm or less.

20 Claims, 5 Drawing Sheets

METHOD FOR CONTINUOUS SYNTHESIS OF METAL OXIDE POWDERS

RELATION TO OTHER APPLICATIONS

This patent application claims priority from provisional applications 61/831,251 filed Jun. 5, 2013 and provisional application 61/831,256 filed Jun. 5, 2013, which are hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relates to a method for the production of crystalline mixed-metal oxides using a precursor solution comprising a polymerizing agent, chelating agent, and a solvent, whereby one or more droplets of the precursor solution are discharged using a spray or atomizing process into a reactor having multiple temperature zones.

BACKGROUND

Mixed-metal oxides are produced industrially on a large scale for a variety of uses. Many of these materials are produced in large quantities and in continuous processes such as spray pyrolysis. These processes utilize synthesis methods that involve precursor solutions, typically metal salts, dissolved in a solvent and other dispersing agents. The solution is atomized or delivered by spraying into a reaction chamber, where heat is supplied by either some external means or through subsequent combustion of the solvent. Solid nano-oxide powders result where the mixed-metal oxide powders generally have final stoichiometries determined by the precursor solution compositions. While these processes can operate continuously and generate large output volumes, these dry-precipitate-calcine type methods have limited control over a number of significant material properties, such as crystal structure, homogeneity, morphology, metal dispersion, and other surface properties that can be beneficial to the material performance in a number of applications.

Finer control over mixed-metal oxide synthesis can be obtained using sol gel methods which exploit the tendency of some metal alkoxides or metal organics to form a precursor gel with metal ions intimately mixed (or arranged) in repeating units. The resulting like gel then undergoes decomposition by heating to yield oxides of desired particle size and chemical nature. A closely related method is the Pechini method. In this method, typically an aqueous solution of metal nitrate or other soluble metal salts are mixed with a chelating agent such as citric acid to form a sol. A polyhydroxy alcohol or amine is then added, and the precursor solution is stirred continuously and heated to around 60-70° C. to evaporate substantially all the solvent, and leaving a viscous material comprised of metal chelates bonded to polymer forming species. The dense, viscous gel-like material is then rapidly heated to about 130° C. to initiate polymerization reaction, and the exothermic polymerization reaction raises temperature above 300° C., evolving gases and expanding the polymer network to form a solid metal organic foam material. Generally the material is cooled to about 130° C., stored for about 12 hours, then ramped up from ambient temperature to about 900° C. and held for several hours. During heating, the organic foam decomposes to an amorphous mixed-metal oxide precursor which begins to form crystal structures around 350° C., and is typically completed around 900° C. These methods as stated do generate finer control over crystallinity, size, and other important factors, however as currently practiced they require batch-type processing of a given volume of precursor solution, and further require long time scales in order to conduct solvent evaporations, polymerizations, and oxide generation and crystallization. The batch nature of these processes combined with the relatively long time scales required generally limits the industrial use of these processes severely.

It would be advantageous to provide a methodology whereby a polymeric precursor method could be performed in a rapid, continuous fashion. Such a methodology would allow the synthesis of crystalline mixed-metal oxides in a manner providing finer control over crystallinity, morphology, and characteristics, simultaneously providing a process suitable for industrial use. It would be additionally advantageous if such a process further provided a means by which the relatively long time periods required by current batch methods could be avoided.

Disclosed here is a method for the method for producing mixed-metal oxides using a plurality of solution droplets comprising a polymerizing agent, chelated metal ions, and a solvent. In this methodology, the solution droplets having a diameter less than about 500 μm are discharged into a first region of a reactor for rapid solvent evaporation, transitioned to a second region of the reactor having a generally higher temperature where polymerization is rapidly accelerated generating a metal organic foam material, followed by additional exposure to increased temperature in order to generate a mixture of amorphous and partially crystalline mixed-metal oxide precursors followed by further heating to produce a substantially crystalline mixed-metal oxide. The use of small droplets combined with higher temperatures greatly and dramatically accelerates the rate at which precursor solution may be transformed into crystalline mixed-metal oxides, and additionally generates crystalline oxides with generally enhanced crystallinity, surface area-per-mass ratio, and sphericity over current polymeric precursor methods.

These and other objects, aspects, and advantages of the present disclosure will become better understood with reference to the accompanying description and claims.

SUMMARY

The disclosure provides a method for the rapid production of crystalline mixed-metal oxides by generating one or more solution droplets from a precursor solution comprised of a polymerizing agent, chelated metal ions, and a solvent, where the solution droplets have a diameter less than about 500 μm. The solution droplets are discharged into a first region of a reactor having a first temperature exceeding the saturation pressure of the solvent. In some embodiments, first temperatures can be in the range 100-300° C. Rapid heat transfer and solvent evaporation occurs in the first region until at least 50% of the solvent is evaporated from the solution droplet, forming a gel droplet. The gel droplet transfers to a second region of the reactor.

In the second region of the reactor, the gel droplets are exposed to a second temperature typically higher than the first temperature and polymerization rapidly accelerates. In some embodiments second temperatures can be in the range 300-700° C. The rapidly accelerated polymerization between the polymerizing agent and chelates within the gel droplet continues in the second region, and a metal organic foam material comprised of the polymer and coordinatively bound metal ions results. Subsequently, the metal organic foam is transferred to a third region of the reactor.

In the third region of the reactor, the metal organic foam is exposed to a third temperature higher than the second temperature and further contacted with oxygen-comprising gas in order to decompose organics comprising the polymer and generate a plurality of initial metal oxides, where the plurality of initial metal oxides are generally a mixture of amorphous and partially crystalline mixed-metal oxide precursors having diameters generally less than about 100 μm. In certain embodiments third temperatures are in the range 700-1000° C. Additional temperature treatment in a fourth region of the reactor completes the formation of the substantially crystalline mixed-metal oxides.

The methodology generates crystalline mixed metal oxides displaying generally enhanced crystallinity, homogeneity, surface area-per-mass ratio, and sphericity, with typical diameters on the order of 10 μm or less. Additionally, the methodology processes an equivalent volume of precursor solution in a significantly shorter time span than that required by typical and currently used batch-type process.

The novel process and principles of operation are further discussed in the following description.

DETAILED DESCRIPTION

Figure 1:
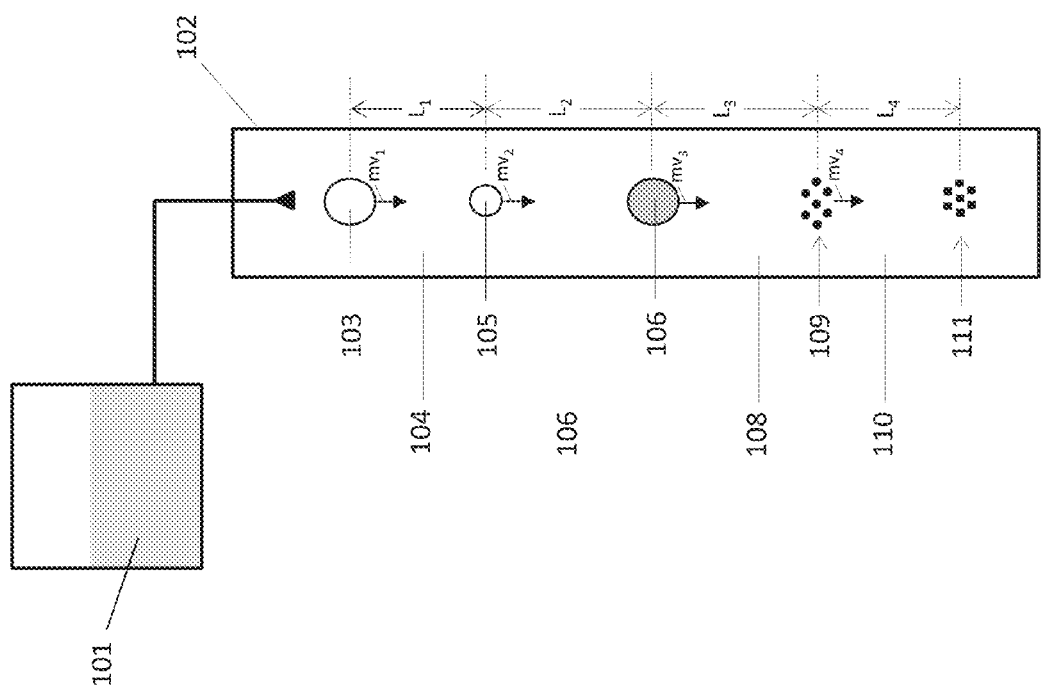
FIG. 1 illustrates a basic embodiment of the method.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for the continuous production of crystalline mixed metal oxides.

The disclosure provides a method for the rapid production of crystalline mixed-metal oxides from a precursor solution comprised of a polymerizing agent, chelated metal ions, and a solvent. The method generates typically a plurality of solution droplets from the precursor solution and discharges the solution droplets into a reactor in order to rapidly generate crystalline mixed-metal oxides in a continuous manner. The method is capable of processing an equivalent volume of precursor solution in a significantly shorter time span than that required by typical and currently used batch-type processes, and the novel use of small droplets of precursor solution as the starting material for the temperature-based process greatly enhances the desirability of the final product, such as crystallinity, homogeneity, surface area-per-mass ratio, and sphericity.

In brief, the method initially generates typically a plurality of solution droplets from a precursor solution comprised of a polymerizing agent, chelated metal ions, and a solvent. The precursor solution is substantially homogeneous, such that the solution droplets generated contain the polymerizing agent, chelated metal ions, and solvent in generally the same proportion as the precursor. The solution droplets having a diameter less than about 500 μm and typically less than 100 μm are discharged into a first region of a reactor, where the first region has a first temperature greater than the saturation temperature of the solvent, and typically much greater. For example, when the solvent is water, a suitable first temperature might be in the range 100-300° C. Within the first region, the relatively high surface area and the relatively low volume of the solution droplets allows a rapid heat transfer and solvent evaporation to occur while concurrently maintaining a relative homogeneity of the precursor mixture contained within the small droplet volume. This rapid evaporation transforms the solution droplets into a plurality of gel droplets having a decreased concentration of solvent and increased concentrations of the polymerizing agent and chelates.

The momentum of the gel droplets transfers the gel droplets out of the first region of the reactor and into a second region of the reactor. In the second region, the smaller gel droplets are exposed to a second temperature typically but not necessarily higher than the first temperature. For example, a suitable second temperature might be in the range 300-700° C. Having efficiently evaporated a majority of the solvent while maintaining the relative homogeneity of the precursor solution within the droplet, polymerization between the polymerizing agent and chelates within the droplet is rapidly accelerated, and a metal organic foam material is generated in the second region. Subsequently, the metal organic foam is transferred to a third region of the reactor having a third temperature typically but not necessarily higher than the second temperature, for example, 700-1000° C. In the third region, the organics comprising the polymer are decomposed generating a plurality of initial metal oxides, where the a plurality of initial metal oxides are generally a mixture of amorphous and partially crystalline mixed-metal oxide precursors having diameters generally less than about 100 μm. Additional temperature treatment in a fourth region of the reactor generates the crystalline mixed-metal oxides. The resulting crystalline mixed-metal oxides display a high degree of sphericity and typical diameters on the order of 50 μm or less.

The method disclosed processes an equivalent volume of precursor solution in a significantly shorter time span than that required by typical and currently used batch-type processes. Further, and significantly, the methodology generates crystalline oxides with generally enhanced crystallinity, homogeneity, surface area-per-mass ratio, and sphericity. These enhanced attributes provide enormous benefit when the crystalline mixed-metal oxide particles are used in processes where higher contact aspects are beneficial, such as catalytic processes and others.

An embodiment of the method disclosed is discussed with reference to FIG. 1. At FIG. 1, a precursor solution 101 is comprised of a polymerizing agent chelates, and a solvent, where the chelates comprise a chelating agent chelating a plurality of metal ions, and where the metal ions comprise ions of one or more metal elements. Precursor solution 101 has a molar ratio of the chelating agent to the polymerizing agent of at least 1:1, and typically has a molar ratio of metal ions to the chelating agent of at least 1:1. The solvent is present in precursor solution 101 at a solvent weight percent of typically at least 10 wt. %, more typically at least 25 wt. %, still more typically at least 40 wt. %. Further, precursor solution 101 is generally homogenous and typically displays a turbidity less than about 100 nephelometric turbidity units (NTU). Additionally, precursor solution 101 has a temperature less than the saturation temperature of the solvent, based on the prevailing pressure condition above precursor solution 101. The homogeneity of precursor solution 101 is maintained by any means known in the art such as stirring or some other appropriate means in order to maintain a turbidity less 100 NTU. Within precursor solution 101, the polymerizing agent and the chelates are soluble and miscible in the solvent.

Within this disclosure, "chelating agent" means a carbon-comprising ligand capable of forming two or more separate coordinate bonds to a single metal ion. Similarly, "chelate" means a chelating agent and a single metal ion where the chelating agent forms two or more separate coordinate bonds to the single metal ion. See e.g., A. D. McNaught and A. Wilkinson, IUPAC Compendium of Chemical Terminology (the "Gold Book") ($2_{nd}$ ed., 1997). In particular embodiments of this disclosure, the formation constant (β) for the chelation reaction between the chelating agent and the single metal ion is equal to at least one.

Within this disclosure, "polymerizing agent" means a molecule having two or more reactive functional end groups and which may form a condensation polymer with a chelate in a step-growth process.

Within this disclosure, the term ""soluble" with respect to a particular solute and solvent means an equilibrium concentration of greater than 1 wt. % solute in a solution of the solute and a solvent, and the term "miscible" means the property of liquids to mix in all proportions, forming a homogeneous solution.

In a particular embodiment, the polymerizing agent is a polyhydroxyl alcohol such as ethylene glycol and the chelating agent is a hydroxycarboxylic acid such as citric acid or ethylenediaminetetraacetic acid (EDTA). In another embodiment the solvent is water, and precursor solution 101 is maintained at atmospheric pressure at a temperature of less than about 100° C.

At FIG. 1, a solution droplet 103 of precursor solution 101 is discharged into a first region 104 of a reactor 102. Solution droplet 103 has an equivalent spherical diameter less than about 500 micron (μm), and is further discharged into first region 104 of reactor 102 such that solution droplet 103 has a first momentum component, illustrated at FIG. 1 as $mv^1$. Additionally, due to the homogenous nature of precursor solution 101, solution droplet 103 is comprised of the polymerizing agent, the chelates, and the solvent in a composition generally reflecting that of precursor solution 101. Correspondingly, solution droplet 103 comprises a polymerizing agent portion, a chelates portion, and a solvent portion, where the polymerizing agent portion is some portion of the polymerizing agent which comprised precursor solution 101, the chelates portion is some portion of the chelates which comprised precursor solution 101, and the solvent portion is some portion of the solvent which comprised precursor solution 101. Additionally at FIG. 1, first region 104 has a first temperature greater than the saturation temperature of the solvent, based on the prevailing pressure condition within first region 104. In a particular embodiment, the first temperature is at least 100° C. greater than the saturation temperature of the solvent, in order to enable the higher rates of evaporation supportable through the use of the relatively small diameter solution droplets, as is discussed further below.

As a result of the first temperature in first region 104, evaporation of solvent from solution droplet 103 occurs in first region 104 and the solvent portion of solution droplet 103 begins to decrease. As the solvent portion of solution droplet 103 decreases, the respective weight percents of the polymerizing agent portion and the chelates portion within solution droplet 103 begin to increase. As a result of the solvent evaporation and the increasing polymerizing agent and chelates portion, the diameter of solution droplet 103 decreases and the viscosity of solution droplet 103 increases. Within the methodology disclosed herein, a first region 104 is provided within reactor 102 such that solution droplet 103 is present in first region 104 until at least 50%, and preferably at least 80%, of the solvent portion of solution droplet 103 evaporates. This is accomplished by providing a translational distance $L_1$ within first region 104 such that the first momentum component $mv_1$ imparted to solution droplet 103 maintains the solution droplet in first region 104 until the specified evaporation occurs. Within this methodology, following the specified evaporation occurring over the translational distance $L_1$, solution droplet 103 is transformed into gel droplet 105 having a second momentum component $mv_2$, as illustrated.

As used herein, "solution droplet" means a droplet having an equivalent spherical diameter of less than 500 μm and comprising a polymerizing agent portion, a chelates portion, and a solvent portion as defined, where the solution droplet has a turbidity of less 100 NTU. In an embodiment, the solution droplet has a molar ratio of the chelating agent portion to the polymerizing agent portion of from about 1:0.7 to about 1:1.3, preferably from about 1:0.8 to about 1:1.2, and more preferably from about 1:0.9 to about 1:1.1, and the solvent portion is present in the solution droplet at from about 70% to about 130% of the solvent weight percent of the precursor solution, preferably from about 80% to about 120% of the solvent weight percent of the precursor solution, and more preferably from about 90% to about 110% of the solvent weight percent of the precursor solution. Additionally and as is understood, the chelates portion of the solution droplet comprises a chelating agent portion chelating some portion of the plurality of metal ions from the precursor solution.

Further as used herein, "gel droplet" means the material derived from evaporating at least 50% of the solvent portion from a solution droplet as defined herein. A determination that that at least 50% of the solvent portion has evaporated may be accomplished using any means known in the art. In a particular embodiment, the solution droplet when discharged has an initial equivalent spherical diameter and the gel droplet has a final equivalent spherical diameter, and the final equivalent spherical diameter of the gel droplet is less than one-half of the initial equivalent spherical diameter of the solution droplet. In another embodiment, the precursor solution and the solution droplet when discharged has viscosity less than about 1 centipoise (cP), and the gel droplet has a viscosity greater than or equal to 1 cP.

Further as used herein, the "equivalent spherical diameter" of a droplet, particle, or any contiguous mass means the diameter of a sphere having an equivalent volume to the droplet, particle, or contiguous mass.

Accomplishing this solvent evaporation by utilizing a small droplet within a first region of a reactor as disclosed provides an inherent homogeneity amongst the solvent portion, the polymerizing agent portion, and the chelates portion as evaporation occurs, and greatly mitigates any non-uniformity within solution droplet 103 that might otherwise arise from any polymerization of the polymerizing agent and the chelates that might occur during the evaporation. The relatively small diameter, the correspondingly low volume, and the correspondingly high surface area to volume ratio of solution droplet 103 allows the relative presence of the solvent portion, the polymerizing agent portion, and the chelates portion within solution droplet 103 remain relatively consistent throughout solution droplet 103 as the evaporation proceeds. This tendency greatly mitigates any stratification that might arise in solution droplet 103 during the evaporation, and allows any subsequent polymerization between the polymerizing agent portion and the chelates portion to occur relatively homogenously throughout solution droplet 103. Additionally and significantly, due to the small diameter, low volume, and high surface area to volume ratio of solution droplet 103, this homogeneity is inherently maintained during evaporation, rather than being reliant on some necessary external process such as a stirring mechanism. This is in direct contrast to existing "batch" methodologies that seek to form a polymer using a polymerizing agent and chelates as described herein, but which conduct solvent evaporation from within volumes of precursor solution much greater than that represented by a droplet having a diameter less than 500 μm, as is described here. These batch methodologies are limited to relatively low temperatures and slow rates of solvent evaporation, and must further conduct this relatively slow evaporation while providing a stirring mechanism, in order to avoid undesirable sequential precipitation of metal cations as well as an inhomogeneous solvent, polymerizing agent, and chelates distribution and the subsequent inhomogeneous polymerization which may result.

Additionally, due to the inherent homogeneity of the solvent portion, the polymerizing agent portion, and the chelates portion maintained in the solution droplet as evaporation occurs, accomplishing the solvent evaporation by utilizing a small solution droplet as disclosed enables a significant increase in the allowable rate of solvent evaporation as compared to the existing batch methodologies. As discussed, batch methodologies limit themselves to relatively slow rates of solvent evaporation and require continuous mixing, in order to mitigate any resulting undesirable sequential precipitation of metal cations and inhomogeneous solvent, polymerizing agent, and chelates distributions which might occur. This necessarily slow rate of solvent evaporation in the batch process greatly limits the speed at which an overall process can be accomplished. For example, in a typical batch process utilizing water as a solvent, the large volume of the precursor solutions heretofore utilized dictates that solvent evaporation occur by heating the solution to a relatively low temperature generally around 60-70° C. while continuously stirring to maintain solvent, polymerizing agent, and chelate homogeneity during evaporation. Such a process generates sufficient evaporation occurring over a time scale of hours. In contrast, because of the inherent homogeneity of the solvent portion, the polymerizing agent portion, and the chelates portion that the small solution droplet of the disclosed methodology enables, a significantly higher rate of evaporation can be sustained. For example, within this methodology and using a similar solution with water as the solvent, a first temperature in the first region of the reactor might be as high as 200° C., 300° C., or 400-600° C., so that while rapid heat transfer and solvent evaporation occurs relatively rapidly through the relatively large surface area of the small droplet, the solvent, polymerizing agent, and chelate homogeneity is maintained within the small droplet by virtue of its relatively small volume. Because the small solution droplet can sustain such high heat transfer rates and high rates of solvent evaporation as compared to the existing batch methods, sufficient evaporation and gel formation of a similarly large volume can be accomplished in minutes as opposed to hours, and with the absence of any necessary stirring.

Discharge of droplet 103 into first region 104 may be accomplished using any suitable means for generating a droplet having an equivalent spherical diameter less than about 500 μm and having a first momentum component $mv_1$. For example, discharge of droplet 103 may be accomplished using an ultrasonic or spray nozzle, other devices generally described as atomizers, or some other appropriate means. Additionally, although first momentum component $mv_1$ and translational distance $L_1$ are represented as substantially parallel at FIG. 1, it is understood that the first momentum component $mv_1$ and the translational distance $L_1$ may have any values and any orientation, provided that the momentum component $mv_1$ generated during the discharge and the translational distance $L_1$ within reactor 102 combine to maintain droplet 103 in first region 104 until at least 50% of the solvent portion of droplet 103 evaporates. Here and elsewhere, "momentum component" means a vector having a direction and having a magnitude equal to a mass times a velocity, and "translational distance" means a total distance traveled by the mass over a path from a first point to a second point, regardless of whether the path is linear or curved.

Additionally, it is understood that that the first temperature of first region 104 of reactor 102 may be any temperature sufficient to evaporate at least 50% of the solvent portion from a solution droplet, provided that the first temperature is greater than the saturation temperature of the solvent based on the prevailing pressure condition within first region 104. In a particular embodiment, the first temperature is at least 100° C.

Following formation of gel droplet 105 having a second momentum component $mv_2$ as described, the second momentum component $mv_2$ displaces gel droplet 105 into a second region 106 of reactor 102. With at least 50%, preferably 80%, of the solvent having been evaporated in first region 104, second region 106 acts to accelerate polymerization within gel droplet 105 by providing a second temperature equal to or greater than the first temperature. Typically, the second temperature is greater than the first temperature, although this is not required. In a particular embodiment, the second temperature is at least 100° C. greater than the first temperature. Due to both the large surface area-to-volume ration of gel droplet 105 and the relative compositional homogeneity maintained through the evaporation process that occurs within first region 104, polymerization within second region 106 accelerates as heat rapidly transfers to gel droplet 105. Further, the uniform composition of gel droplet 105 provides substantially uniform polymer formation through the small volume of gel droplet 105, greatly mitigating or eliminating undesired side reactions during the process. As gel droplet 105 moves through second region 106 of reactor 102, the remaining solvent in gel droplet 105 largely evaporates and the formation of polymer molecules comprising at least some quantity of the polymerizing agent portion and some quantity of the chelates portion initially present in solution droplet 103 proceeds. This polymerization continues and transforms gel droplet 105 into metal organic foam material 107, where metal organic foam material 107 comprises the polymer molecules, and the polymer molecules comprise organics.

Generally speaking, the resulting polymer is a condensation polymer formed by the polymerizing agent and the chelates within gel droplet 105 in a step-growth process. The resulting metal organic foam material 107 is largely devoid of solvent, has a porous structure, and presents an expanded volume over that of the initial gel droplet 105. This expansion combined with the increased porosity significantly increases the surface area of the metal organic foam material 107 over the initial gel droplet 105, which provides significant process advantages during subsequent steps of the process. Further, the surface area-to-mass ratio of the metal organic foam material 107 produced under the methodology of this disclosure, where the process originates with a solution droplet of less than 500 μm, generally greatly exceeds surface area-to-mass ratios achieved at analogous points in currently utilized batch processes. As a result, the increased porosity and the relatively high surface area-to-mass ratio of the metal organic foam material generated here provides distinct advantage during subsequent steps, when additional heat transfer and oxygen contact are employed for removal of organics and crystal formation during charring and pyrolysis events.

Within this process, transformation of gel droplet 105 to metal organic foam material 107 is accomplished by providing a translational distance $L_2$ within second region 106 such that the second momentum component $mv_2$ acting on gel droplet 105 maintains the gel droplet 105 in second region 106 until the metal organic foam material 107 results. Within this methodology, following the processes occurring over the translational distance $L_2$, gel droplet 105 is transformed into metal organic foam material 107 having a third momentum component $mv_3$, as illustrated.

As used here, "metal organic foam material" means a material comprising a condensation polymer formed by the polymerizing agent portion and the chelates portion comprising a gel droplet as defined herein, where the polymer is further comprised of organics. Here "organics" means a molecule comprising carbon and hydrogen. In an embodiment, the gel droplet when entering a second region of a reactor has an initial equivalent spherical diameter and the metal organic foam material has a final equivalent spherical diameter, and the final equivalent spherical diameter of the metal organic foam material is at least 2 times and preferably at least 5 times greater than the initial equivalent spherical diameter of the gel droplet.

It is understood that that the second temperature of second region 106 of reactor 102 may be any temperature sufficient to transform a gel droplet into a metal organic foam material as defined. Typically the second temperature is greater than the first temperature, however this is not required. Within this disclosure, the second temperature may be any temperature, provided the temperature is sufficient to transform a gel droplet as defined into a metal organic foam material as defined over the translational distance $L_2$ within second region 106 of reactor 102. Typically, in order to minimize the translational distance $L_2$ required in reactor 102 and in order to accelerate polymer formation, the second temperature is greater than the first temperature. For example, within this methodology and depending on the first temperature, the second temperature might be greater than 200° C., greater than 300° C., 400-600° C., or 600-800° C. In a particular embodiment, the second temperature is greater than 100° C. In another embodiment the second temperature is at least 100° C. greater than the first temperature. In a further embodiment, the second temperature is at least 200° C., and in still another embodiment, the second temperature is at least 400° C.

Additionally, although second momentum component $mv_2$ and translational distance $L_2$ are represented as substantially parallel at FIG. 1, it is understood that the second momentum component $mv_2$ and the translational distance $L_2$ may have any values and any orientation, provided that the momentum component $mv_2$ and the translational distance $L_2$ within reactor 102 combine to maintain gel droplet 105 in second region 106 until gel droplet 105 transforms into metal organic foam material 107 as defined. Additionally, it is understood that while the second momentum component $mv_2$ possessed by gel droplet 105 may derive solely from the first momentum component $mv_1$ imparted to solution droplet 103, this is not a limitation within the process, and second momentum component $mv_2$ may be imparted to gel droplet 105 using any means known in the art.

Following formation of metal organic foam material 107 having a third momentum component $mv_3$ as described, the third momentum component $mv_3$ displaces metal organic foam material 107 into a third region 108 of reactor 102, where third region 108 of reactor 102 provides a third temperature. This third temperature is sufficient to decompose at least some quantity of the organics comprising the polymer molecules formed in second region 106 and making up metal organic foam material 107. Additionally within third region 108 of reactor 102, metal organic foam material 107 contacts and begins reaction with an oxygen-comprising gas flowing generally throughout the reactor. The combination of the third temperature and the gaseous oxygen within third region 108 acts to decompose and remove the organics comprising the polymer molecules and generate a plurality of initial metal oxide particles, represented generally at 109. The relatively high surface area-to-mass ratio and increased porosity of the metal organic foam material 107 generated within second region 106 of this process enhances the heat transfer to and oxygen contact of metal organic foam material 107 during this process, so that the resulting organic decomposition and removal occurs in a highly uniform manner throughout metal organic foam material 107. The resulting plurality of initial metal oxide particles is generally a mixture of amorphous and partially crystalline mixed-metal oxide precursor particles with a powder-like consistency and with an average equivalent spherical diameter of less than about 100 µm, typically less than 50 µm, across the plurality. Additionally, plurality of initial metal oxide particles 109 has a fourth momentum component $mv_4$, where here the fourth momentum component $mv_4$ describes the sum of the momenta possessed by individual initial metal oxide particles comprising the plurality of initial metal oxide particles.

Within this process, transformation of metal organic foam material 107 to the plurality of initial metal oxide particles 109 is accomplished by providing a translational distance $L_3$ within third region 108 such that the third momentum component $mv_3$ acting on metal organic foam material 107 maintains the metal organic foam material 107 in third region 108 until the plurality of plurality of initial metal oxide particles 109 generates. Within this methodology, following the processes occurring over the translational distance $L_3$, metal organic foam material 107 is transformed into the plurality of plurality of initial metal oxide particles 109 having a fourth momentum component $mv_4$, as illustrated.

As used here, "initial metal oxide" means a particle comprising a mixed-metal oxide having a composition $M_aO_b$, where M is one or more of the metals which comprised the plurality of metal ions within precursor solution 101 and which further comprised the chelate portion of solution droplet 103, and where O is oxygen, and where a>0 and b>0. The initial metal oxide may further comprise metal carbonates having a composition $CO_xM_yO_z$, where $1 \geq x \geq 3$, y>1, and $z \geq 0$. The plurality of initial metal oxide particles as described indicate the presence of metal-oxygen bonds under Fourier transform infrared spectroscopy (FTIR). Additionally, the plurality of plurality of initial metal oxides when subjected to X-ray diffraction methods (XRD) fails to generate an XRD peak greater than 50% above background. In an embodiment, the plurality of initial metal oxide particles have an average equivalent spherical diameter of less than about 100 µm. In another embodiment, the average equivalent spherical diameter is less than 50 µm.

It is understood that that the third temperature of third region 108 of reactor 102 may be any temperature sufficient to decompose organics comprising the polymer molecules as defined. Typically the third temperature is at least equal to the second temperature, however this is not required. Within this disclosure, the third temperature may be any temperature, provided the temperature is sufficient to transform a metal organic foam material as defined into a plurality of initial metal oxide particles as defined over the translational distance $L_3$ within third region 108 of reactor 102. For example, within this methodology and depending on the second temperature, the third temperature might be greater than 200° C. greater than 300° C. 400-600° C., 600-800° C., or 800-1000° C., provided that transformation of the metal organic foam material into the plurality of initial metal oxide particles as defined results in third region 108 of reactor 102. In a particular embodiment, the third temperature is greater than 400° C. In another embodiment, the third temperature is at least 500° C., and in still another embodiment, the third temperature is at least 800° C.

Additionally, although third momentum component $mv_3$ and translational distance $L_3$ are represented as substantially parallel at FIG. 1, it is understood that the third momentum component $mv_3$ and the translational distance $L_3$ may have any values and any orientation, provided that the momentum component $mv_3$ and the translational distance $L_3$ within reactor 102 combine to maintain metal organic foam material 107 in third region 108 until metal organic foam material 107 transforms into the plurality of initial metal oxide particles 109 as defined. Additionally, it is understood that while the third momentum component $mv_3$ possessed by metal organic foam material 107 may derive solely from the second momentum component $mv_2$ possessed by gel droplet 105, this is not a limitation within the process, and third momentum component $mv_3$ may be imparted to the metal organic foam material 107 using any means known in the art.

Following formation of the plurality of initial metal oxide particles 109 having a fourth momentum component $mv_4$ as described, the fourth momentum component $mv_4$ displaces the plurality of initial metal oxide particles 109 into a fourth region 110 of reactor 102, where fourth region 110 of reactor 102 provides a fourth temperature, where the fourth temperature is sufficient to transform some portion of the plurality of initial metal oxide particles 109 to a plurality of substantially crystalline mixed-metal oxide particles, represented generally at 111. Additionally, fourth region 110 of reactor 102 provides additional oxygen-comprising gas, so that the plurality of initial metal oxide particles 109 is additionally contacted by gaseous oxygen. The combination of the fourth temperature and the additional gaseous oxygen within fourth region 110 interact with the relatively uniform initial metal oxide particles generated within third region 108 to produce highly uniform crystalline mixed-metal oxides having a high degree of crystallinity. The resulting plurality of substantially crystalline mixed-metal oxide particles generally have an average equivalent spherical diameter of less than about 500 µm, typically less than 100 µm, across the plurality. Additionally, the resulting plurality of substantially crystalline mixed-metal oxide particles provide a sphericity and resulting surface area-to-volume ratio far in excess of similar crystalline mixed-metal oxides produced using typical batch processes, which are generally described as flakes. The higher surface area-to-volume ratio provides enormous benefit when the crystalline mixed-metal oxide particles are used in processes where higher contact aspects are beneficial, for example, in catalytic processes.

As used here, "substantially crystalline mixed-metal oxide particles" means a particle comprising mixed-metal oxides as defined, where the plurality of substantially crystalline mixed-metal oxide particles indicate the presence of metal-oxygen bonds under Fourier transform infrared spectroscopy (FTIR), and where the plurality of substantially crystalline mixed-metal oxide particles exhibit an XRD peak at least 50% above background when subjected to XRD methods. In an embodiment, the plurality of substantially crystalline mixed-metal oxide particles have an average equivalent spherical diameter of less than about 500 µm. In another embodiment, the average equivalent spherical diameter is less than 100 µm, and in another embodiment the average equivalent spherical diameter is less than 10 µm. In a further embodiment, the plurality of substantially crystalline mixed-metal oxide particles have an average sphericity of at least 0.6, where the sphericity of an individual particle is equal to the ratio of the surface area of a sphere having the same volume as the individual particle to the surface area of the individual particle.

The particular substantially crystalline mixed-metal oxides generated in the fourth region of the reactor are a function of multiple parameters within the fourth region, such as gas flow rate, residence time, oxygen content, temperature, and other variable factors known to those skilled in the art of crystalline mixed-metal oxide synthesis. Further, as is understood, any stoichiometry in the resulting crystalline mixed-metal oxides is largely a function of the relative presence of the metal ions comprising the initial precursor solution. Correspondingly, as is understood, these factors and others known to be pertinent to those skilled in the art will require some degree of manipulation in order to effectively generate a particular crystalline mixed-metal oxide having a specific composition and crystal structure.

It is understood that that the fourth temperature of fourth region 110 of reactor 102 may be any temperature sufficient to generate the plurality of substantially crystalline mixed-metal oxide particles. Typically the fourth temperature is at least equal to the third temperature, however this is not required. Within this disclosure, the fourth temperature may be any temperature, provided the temperature is sufficient to transform a plurality of initial metal oxide particles as defined into a plurality of substantially crystalline mixed-metal oxide particles as defined over the translational distance $L_4$ within fourth region 110 of reactor 102. For example, within this methodology and depending on the third temperature, the fourth temperature might be greater than 300° C., 400-600° C., 600-800° C., or 800-1000° C., provided that transformation of the plurality of plurality of initial metal oxide particles into the plurality of substantially crystalline mixed-metal oxide particles as defined results in fourth region 110 of reactor 102. In a particular embodiment, the fourth temperature is greater than 500° C. In another embodiment, the fourth temperature is at least 800° C.

Additionally, although fourth momentum component $mv_4$ and translational distance $L_4$ are represented as substantially parallel at FIG. 1, it is understood that the fourth momentum component $mv_4$ and the translational distance $L_4$ may have any values and any orientation, provided that the momentum component $mv_4$ and the translational distance $L_4$ within reactor 102 combine to maintain the plurality of initial metal oxide particles 109 in fourth region 110 until the plurality of plurality of initial metal oxide particles 109 transforms into the plurality of substantially crystalline mixed-metal oxide particles 111 as defined. Additionally, it is understood that while the fourth momentum component $mv_4$ possessed by the plurality of initial metal oxide particles 109 may derive solely from the third momentum component $mv_3$ possessed by metal organic foam material 107, this is not a limitation within the process, and fourth momentum component $mv_4$ may be imparted to the plurality of initial metal oxide particles 109 using any means known in the art.

Further, within the foregoing description of the disclosed process, it is understood that the solution droplet, gel droplet, metal organic foam material, plurality of initial metal oxide particles, and plurality of substantially crystalline mixed-metal oxides may be a single entity in a plurality of like materials. For example, the methodology may be accomplished by spraying a plurality of solution droplets into the first region of the reactor, such that a plurality of gel droplets enters the second region of the reactor, such that a subsequent plurality of metal organic foam materials enters the third region of the reactor, and such that multiple pluralities of initial metal oxide particles and substantially crystalline mixed-metal oxide particles are generated.

An additional embodiment of the disclosed method is illustrated with reference to FIG. 2. At FIG. 2, a precursor solution 201 is comprised of a polyhydroxyl alcohol as the polymerizing agent, chelates comprised of a hydroxycarboxylic acid chelating a plurality of metal ions, and water as the solvent. Precursor solution 201 has a molar ratio of hydroxycarboxylic acid to polyhydroxyl alcohol of at least 1:1, has a molar ratio of metal ions to hydroxycarboxylic acid of at least 1:1.2, has a solvent weight percent of about 50 wt. %, and displays a turbidity less than 100 NTU. Precursor solution 201 is maintained generally at room temperature and atmospheric pressure, and is stirred by stirring mechanism 224 to maintain relative homogeneity.

Reactor 202 is comprised of an atomizer 213, a first region bounded by boundary 214, a second region bounded by boundary 215, a third region bounded by boundary 216, and a fourth region bounded by boundary 217. The heating element 218 is arranged to provide a first temperature in the first region of reactor 202, heating element 219 is arranged to provide a second temperature in the second region of reactor 202, heating element 220 is arranged to provide a third temperature in the third region of reactor 202, and heating element 221 is arranged to provide a fourth temperature in the fourth region of reactor 202. Additionally, atomizer 213 is oriented in a downward direction based on the illustrated gravity vector G. As illustrated, the second region is displaced from the first region in the direction of G, the third region is displaced from the second region in the direction of G, and the fourth region is displaced from the third region in the direction of G. Inlet 222 and outlet 223 are additionally present to provide the flow of an oxygen-comprising gas through reactor 202. Although shown here as a generally counter-current flow, any other flow arrangements such as concurrent can also be utilized, provided that the flow provides an oxygen-comprising gas in at least the third and fourth regions of reactor 202.

Figure 2:
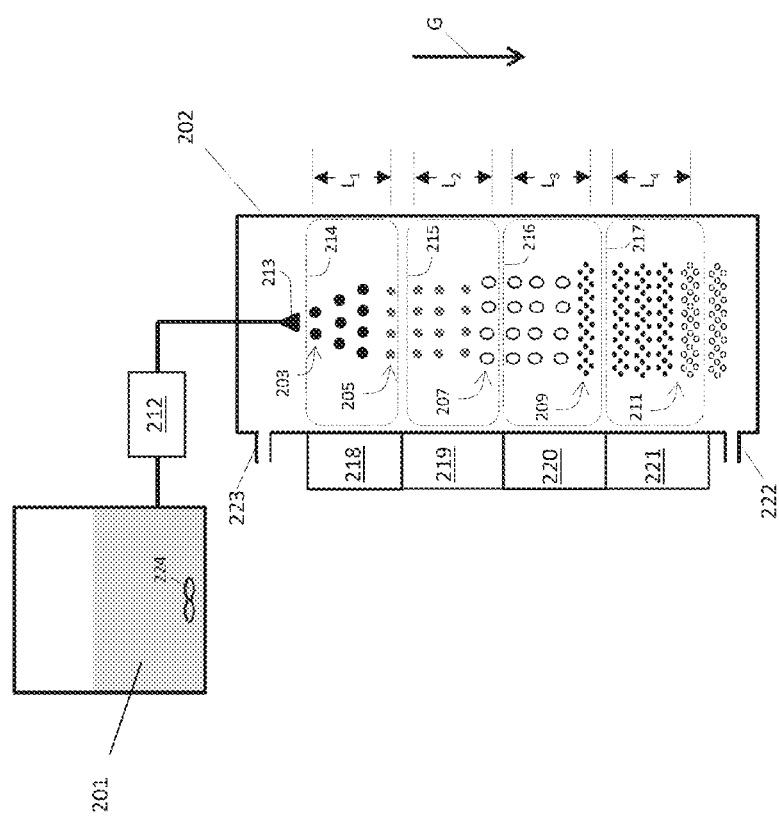
FIG. 2 illustrates an additional embodiment of the method.

At FIG. 2, precursor solution 201 is displaced to atomizer 213 using motive means 212, and atomizer 213 discharges a plurality of solution droplets represented generally at 203. The plurality of solution droplets 203 have an average equivalent spherical diameter of about 500 µm, and are discharged with a first momentum component in the downward direction into the first region of reactor 202. Concurrently, heating element 218 maintains a first temperature of 100-300° C. in the first region of reactor 202. As the plurality of solution droplets 203 enters the first region at the first temperature of 100-300° C., heat rapidly transfers to the individual solution droplets and rapid water evaporation from each droplet results, concentrating the polyhydroxyl alcohol and chelates within the individual droplets. As previously discussed, the relatively small size and high surface area-to-volume ratio of the individual droplets allows the rapid solvent evaporation to occur while relative compositional homogeneity is maintained within the small droplet volume. This process continues over the translational distance $L_1$ within the first region of reactor 202 until about 80% of the water in each individual droplet is evaporated, and the plurality of gel droplets represented generally at 205 is produced, where the plurality of gel droplets 205 has a second momentum component in the downward direction. Due to the evaporation which has occurred in the first region, the plurality of gel droplets 205 has a final average equivalent spherical diameter of less than half that of the entering solution droplets. Under the conditions of this embodiment and with a moderate spray rate, the translational distance $L_1$ employed here is less than 5 feet and typically on the order of about 2 feet.

The second momentum component acts to displace the plurality of gel droplets 205 into the second region of reactor 202, bounded by boundary 215 at FIG. 2 as discussed. At FIG. 2, heating element 219 maintains a second temperature of 300-700° C. in the second region of reactor 202. With about 80% of the water solvent having been evaporated in the first region of reactor 202, the second temperature of the second region rapidly accelerates polymerization within the plurality of gel droplets 205. Due to the relative compositional homogeneity, substantially uniform polymer formation occurs in individual gel droplets, greatly mitigating or eliminating any undesired side reactions during the process. The remaining water solvent in the individual gel droplets largely evaporates, and polymer molecules comprising polyhydroxyl alcohol and the hydroxycarboxylic acid comprising the chelates forms relatively rapidly. This polymerization continues, and the second momentum component and the translational distance $L_2$ in the second region combine to enable transformation of the gel droplets into a plurality of metal organic foam materials represented generally at 207, where the plurality of metal organic foam materials 207 has a third momentum component in the downward direction. Due to the expansion which occurs in the second region, the plurality of metal organic foam materials 207 has a final average equivalent spherical diameter of greater than 2 times that of the entering gel droplets. Under the conditions of this embodiment and with a moderate spray rate, the translational distance $L_2$ employed here is less than 5 feet and typically on the order of about 2 feet.

The third momentum component acts to displace the plurality of metal organic foam materials 207 into the third region of reactor 202, bounded by boundary 216 at FIG. 2 as discussed. In accordance with the method disclosed, the third region has a third temperature sufficient to decompose at least some quantity of the organics comprising the polymer molecules of the metal organic foam. Correspondingly, at FIG. 2, heating element 220 maintains a third temperature of 700-1000° C. in the third region of reactor 202. Further, an air flow entering at inlet 222 provides air as an oxygen-comprising gas to the third region of reactor 202. As a result, as the plurality of metal organic foam materials 207 enters the third region, the 700-1000° C. temperature and the gaseous oxygen within the third region act to decompose and remove the organics comprising the individual metal organic foam materials. The relatively high surface area-to-mass ratio and increased porosity of the metal organic foam materials generated in the second region enhances the heat transfer and oxygen contact during this process, so that the organic decomposition and removal occurs in a highly uniform manner. As this process continues, the third momentum component and the translational distance $L_3$ in the third region combine to enable transformation of the metal organic foam materials into a plurality of initial metal oxide particles represented generally at 209, where the plurality of plurality of initial metal oxide particles 209 has a fourth momentum component in the downward direction. The plurality of initial metal oxide particles 209 produced comprise some portion of the plurality of metal ions comprising precursor solution 202, indicate the presence of the metal-oxygen bonds under FTIR spectroscopy, and reflect an amorphous nature under XRD methods. Generally, the plurality of initial metal oxide particles have an average equivalent spherical diameter of less than about 50 µm. Under the conditions of this embodiment and with a moderate spray rate, the translational distance $L_3$ employed here is less than 5 feet and typically on the order of about 2 feet.

The fourth momentum component acts to displace the plurality of initial metal oxide particles 209 into the fourth region of reactor 202, bounded by boundary 217 at FIG. 2 as discussed, where the fourth temperature is additionally sufficient to transform the plurality of initial metal oxide particles to a plurality of substantially crystalline mixed-metal oxide particles. Correspondingly, at FIG. 2, heating element 221 maintains a fourth temperature of at least 700° C. in the fourth region of reactor 202, generally equal to the third temperature. Additionally, the air flow entering at inlet 222 provides an oxygen-comprising gas to the fourth region. As a result, as the plurality of initial metal oxide particles 209 enters the fourth region, the 700° C. temperature and the gaseous oxygen interact with the relatively uniform initial metal oxide particles to produce highly uniform substantially crystalline mixed-metal oxides. As this process continues, the fourth momentum component and the translational distance $L_4$ in the fourth region combine to enable transformation of the plurality of initial metal oxide particles into a plurality of substantially crystalline mixed-metal oxides particles represented generally at 211. The resulting plurality of substantially crystalline mixed-metal oxide particles generally have an average equivalent spherical diameter of less than about 100 µm across the plurality, and typically less than about 50 µm. Under the conditions of this embodiment and with a moderate spray rate, the translational distance $L_4$ employed here is less than 5 feet and typically on the order of about 2 feet.

Figure 3:
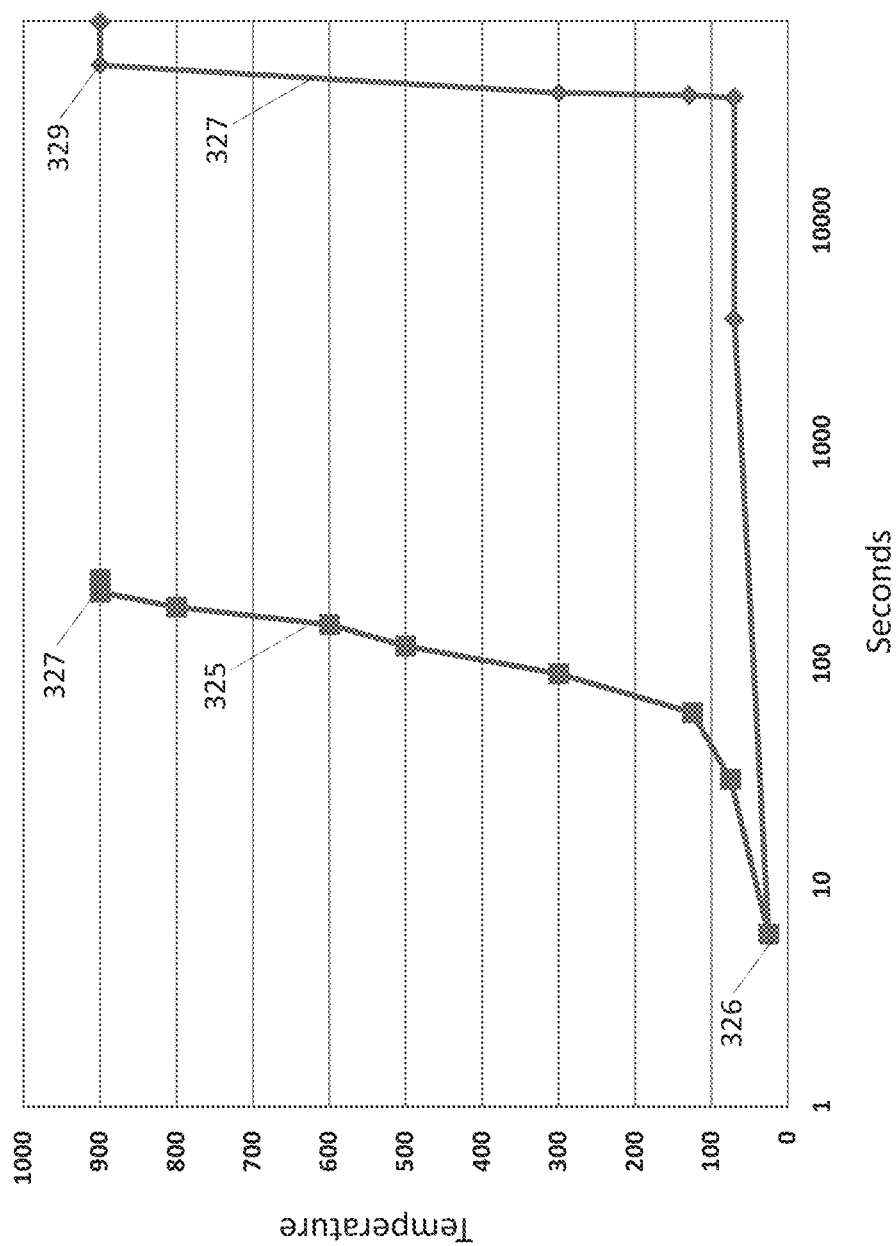
FIG. 3 illustrates a temperature versus time profiles for an embodiment versus a batch methodology.

The relative rapidity at which the process as disclosed here can be conducted in order to convert a solution droplet as defined to the plurality of substantially crystalline metal oxides described is represented at FIG. 3. FIG. 3 illustrates a temperature trace 325 versus time for the production of about 10 grams of substantially crystalline metal oxide using the process as disclosed here, where the time axis is presented as a log scale. At FIG. 3, Solution droplets at a temperature of about 20° C. enters a first region of a reactor at point 326, proceed through the second, third, and fourth regions of the reactor as described, and subsequently exit the reactor as the substantially crystalline mixed-metal oxides at a temperature of about 900° C. at point 327. In contrast at FIG. 3, temperature trace 328 illustrates a typical profile for production of an equivalent 10 grams with a currently utilized batch process, where crystalline mixed-metal oxides are produced at a temperature of about 900° C. at point 329. As is illustrated and under conditions similar to those described at FIG. 2, this transition of the solution droplet is accomplished in at least an order of magnitude less time than the batch process. This rapidity combined with discharging a plurality of solution droplets into a reactor as described allows the disclosed process to generate substantially crystalline mixed-metal oxides from a given volume of precursor solution in a significantly shorter time period than would be required using an analogous batch process.

Figure 4:
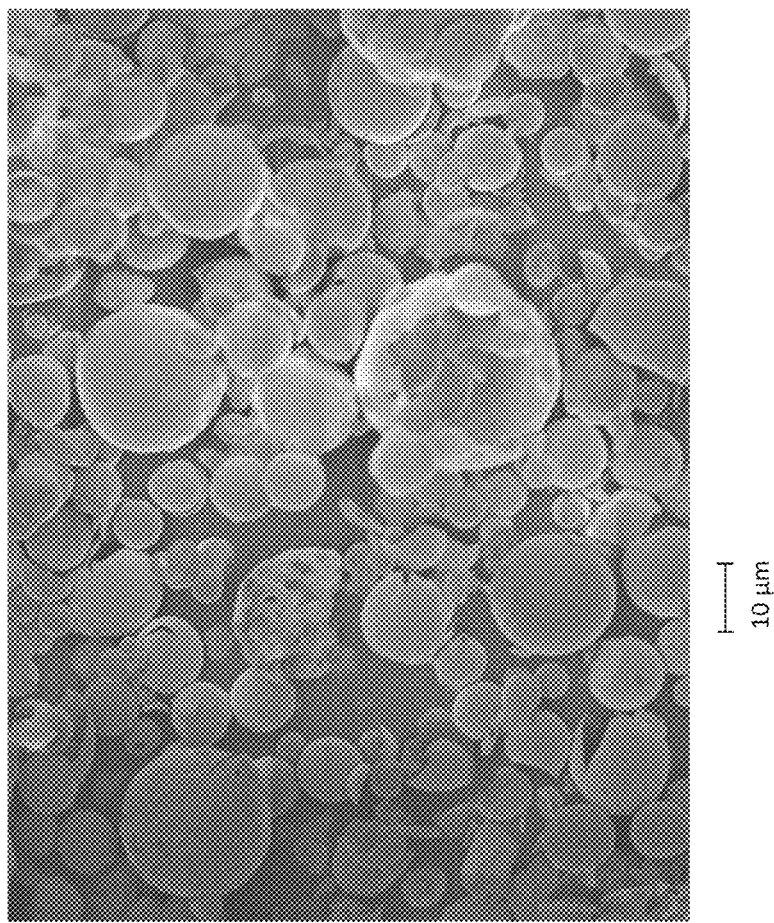
FIG. 4 illustrates an embodiment of the crystalline mixed-metal oxides generated.
Figure 5:
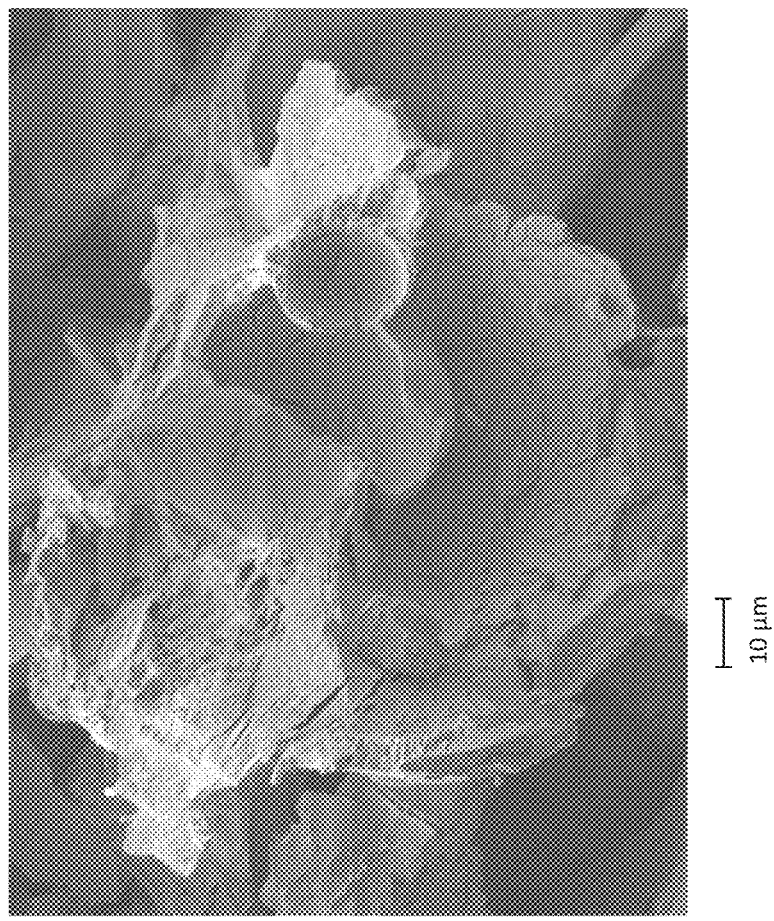
FIG. 5 illustrates crystalline mixed-metal oxides generated using batch methods.

Additionally, the substantially crystalline mixed-metal oxide particles provide a sphericity and surface area far in excess of similar crystalline mixed-metal oxides produced using typical batch processes. For example, crystalline mixed-metal oxides produced with an analogous batch process generally produce flake-like powders with surface areas less than about 5 $m^2$ per gram. In contrast, the spherical crystalline oxides produced using the continuous process disclosed generally have surface areas at least a factor of 2 greater. In an embodiment, the substantially crystalline mixed-metal oxide particles have surface areas greater than about 25 $m^2$ per gram. This higher surface area-to-volume ratio provides enormous benefit when the substantially crystalline mixed-metal oxide particles are used in processes where higher contact aspects are beneficial. Exemplary crystalline mixed-metal oxides generated through the process as disclosed here are provided at FIG. 4. As shown, the resulting substantially crystalline mixed-metal oxides display a high degree of sphericity and typical diameters on the order of 50 µm or less. For comparison, crystalline mixed-metal oxides generated through an analogous batch process are shown at FIG. 5.

Thus, provided here is a method for the rapid production of crystalline mixed-metal oxides from a precursor solution comprised of a polymerizing agent, chelated metal ions, and a solvent. The method generates typically a plurality of solution droplets from the precursor solution and discharges the solution droplets into a reactor in order to rapidly generate crystalline mixed-metal oxides in a continuous manner. The method is capable of processing an equivalent volume of precursor solution in a significantly shorter time span than that required by typical and currently used batch-type process, and the use of small droplets as the starting material for the temperature-based process greatly enhances the desirability of the final product, such as crystallinity, homogeneity, surface area-per-mass ratio, and sphericity.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of producing a crystalline mixed-metal oxide comprising:

maintaining a precursor solution comprising a polymerizing agent, chelates, and a solvent, where the chelates comprise a which chelates agent chelating a plurality of metal ions, and where the precursor solution has a molar ratio of the chelating agent to the polymerizing agent of at least 1:1, and where the solvent is present in the precursor solution at a solvent weight percent, and where the precursor solution is maintained at a solution temperature less than the saturation temperature of the solvent;

discharging a solution droplet into a first region of a reactor, where the first region of the reactor has a first temperature greater than the saturation temperature of the solvent, and where the solution droplet is a droplet of the precursor solution, and where the solution droplet has an equivalent spherical diameter of less than 500 μm, and where the solution droplet has a first momentum component, and where the solution droplet comprises a polymerizing agent portion, a chelates portion, and a solvent portion, providing a translational distance in the first region of the reactor such that the first momentum component of the solution droplet maintains the solution droplet in the first region of the reactor for a time sufficient to evaporate at least 50% of the solvent portion from the solution droplet and transform the solution droplet to a gel droplet having a second momentum component;

permitting the second momentum component to displace the gel droplet to a second region of the reactor having a second temperature, and providing a translational distance in the second region of the reactor such that the second momentum component maintains the gel droplet in the second region of the reactor for a time sufficient to generate polymer molecules, where the polymer molecules comprise some quantity of the polymerizing agent portion and some quantity of the chelates portion, and where the polymer molecules comprise organics, and transforming the gel droplet to a metal organic foam material having a third momentum component, where the metal organic foam material comprises the polymer molecules;

permitting the third momentum component to displace the metal organic foam material to a third region of the reactor having a third temperature and contacting the metal organic foam material with gaseous oxygen in the third region of the reactor, where the third temperature is sufficient to decompose a quantity of the organics, and providing a translational distance in the third region of the reactor such that the third momentum component maintains the metal organic foam material in the third region of the reactor for a time sufficient to decompose the quantity of organics and transform the metal organic foam material to a plurality of initial metal oxide particles having a fourth momentum component;

permitting the fourth momentum component to displace the plurality of initial metal oxide particles to a fourth region of the reactor having a fourth temperature and contacting the plurality of initial metal oxide particles with additional gaseous oxygen in the fourth region of the reactor, where the fourth temperature is sufficient to transform some portion of the plurality of initial metal oxide particles to a plurality of substantially crystalline mixed-metal oxide particles, and providing a translational distance in the fourth region of the reactor such that the fourth momentum component maintains some portion of the plurality of initial metal oxide particles in the fourth region of the reactor for a time sufficient to transform the some portion of the plurality of initial metal oxide particles to the plurality of substantially crystalline mixed-metal oxide particles, thereby producing the crystalline mixed-metal oxide.

2. The method of claim 1 where the precursor solution and the solution droplet have an NTU value less than 100.

3. The method of claim 2 where the chelates portion comprise a chelating agent portion, and where the solution droplet has a molar ratio of the chelating agent portion to the polymerizing agent portion of from about 1:0.7 to about 1:1.3, and where the solvent portion is present in the droplet at from about 70% of the solvent weight percent to about 130% of the solvent weight percent.

4. The method of claim 3 where the gel droplet has a second equivalent spherical diameter, where the second equivalent spherical diameter of the gel droplet is less than one-half of the equivalent spherical diameter of the solution droplet.

5. The method of claim 4 where the precursor solution has viscosity less than 1 cP and the gel droplet has a viscosity greater than or equal to 1 cP.

6. The method of claim 4 where the metal organic foam material has a third spherical diameter, and where the third spherical diameter is at least 2 times greater than the second spherical diameter.

7. The method of claim 6 where the plurality of initial metal oxide particles comprise mixed-metal oxides having a composition $M_aO_b$, where M is some portion of the plurality of metal ions comprising the chelates within the precursor solution, and a>0, b>0.

8. The method of claim 3 where the solvent weight percent is at least 25 wt. % of the precursor solution.

9. The method of claim 8 where the first temperature is at least 100° C. greater than the saturation temperature of the solvent, and where the second temperature is at least 100° C. greater than the first temperature.

10. The method of claim 9 where the third temperature is greater than the second temperature.

11. The method of claim 3 where the solvent is water and where the solution temperature is less than 100° C.

12. The method of claim 11 where the polymerizing agent is a polyhydroxyl alcohol and the chelating agent is a hydroxycarboxylic acid.

13. The method of claim 12 where the first temperature is from about 100° C. to about 300° C., and where the second temperature is from about 300° C. to about 700° C., and where the third temperature is from about 700° C. to about 1000° C.

14. A method of producing a crystalline mixed-metal oxide comprising:

maintaining a precursor solution comprising a polymerizing agent, chelates, and a solvent, where the chelates comprise a chelating agent which chelates a plurality of metal ions, and where the precursor solution has a molar ratio of the chelating agent to the polymerizing agent of at least 1:1, and where the solvent is present in the precursor solution at a solvent weight percent, where the solvent weight percent is at least 25 wt. % of the precursor solution, and where the precursor solution has an NTU value less than 100 and where the precursor solution is maintained at a solution temperature less than the saturation temperature of the solvent;

discharging a solution droplet into a first region of a reactor, where the first region of the reactor has a first temperature greater than the saturation temperature of the solvent, and where the solution droplet is a droplet of the precursor solution, and where the solution droplet has an equivalent spherical diameter of less than 500 μm, and where the solution droplet has a first momentum component, and where the solution droplet comprises a polymerizing agent portion, a chelates portion, and a solvent portion;

providing a translational distance in the first region of the reactor such that the first momentum component of the solution droplet maintains the solution droplet in the first region of the reactor for a time sufficient to evaporate at least 50% of the solvent portion from the solution droplet and transform the solution droplet to a gel droplet having a second momentum component and having a second equivalent spherical diameter, where the second equivalent spherical diameter of the gel droplet is less than one-half of the equivalent spherical diameter of the solution droplet;

permitting the second momentum component to displace the gel droplet to a second region of the reactor having a second temperature, and providing a translational distance in the second region of the reactor such that the second momentum component maintains the gel droplet in the second region of the reactor for a time sufficient to generate polymer molecules, where the polymer molecules comprise some quantity of the polymerizing agent portion and some quantity of the chelates portion, and where the polymer molecules comprise organics, and transforming the gel droplet to a metal organic foam material having a third momentum component, where the metal organic foam material comprises the polymer molecules, and where the metal organic foam material has a third spherical diameter, where the third spherical diameter of the metal organic foam material is at least 2 times greater than the second spherical diameter of the gel droplet;

permitting the third momentum component to displace the metal organic foam material to a third region of the reactor having a third temperature and contacting the metal organic foam material with gaseous oxygen in the third region of the reactor, where the third temperature is sufficient to decompose a quantity of the organics, and providing a translational distance in the third region of the reactor such that the third momentum component maintains the metal organic foam material in the third region of the reactor for a time sufficient to decompose the quantity of organics and transform the metal organic foam material to an plurality of initial metal oxide particles having a fourth momentum component;

permitting the fourth momentum component to displace the plurality of initial metal oxide particles to a fourth region of the reactor having a fourth temperature and contacting the plurality of initial metal oxide particles with additional gaseous oxygen in the fourth region of the reactor, where the fourth temperature is sufficient to transform some portion of plurality of initial metal oxide particles to a plurality of substantially crystalline mixed-metal oxide particles, and providing a translational distance in the fourth region of the reactor such that the fourth momentum component maintains some portion of the plurality of initial metal oxide particles in the fourth region of the reactor for a time sufficient to transform the some portion of the plurality of initial metal oxide particles to the plurality of substantially crystalline mixed-metal oxide particles, thereby producing the crystalline mixed-metal oxide.

15. The method of claim 14 where the chelates portion comprise a chelating agent portion, and where the solution droplet has a molar ratio of the chelating agent portion to the polymerizing agent portion of from about 1:0.7 to about 1:1.3, and where the solvent portion is present in the droplet at from about 70% of the solvent weight percent to about 130% of the solvent weight percent.

16. The method of claim 15 where the first temperature is at least 100° C. greater than the saturation temperature of the solvent, and where the second temperature is at least 100° C. greater than the first temperature.

17. The method of claim 16 where the third temperature is at least 100° C. greater than the second temperature.

18. The method of claim 17 where the plurality of initial metal oxide particles comprise mixed-metal oxides having a composition $M_aO_b$, where M is some portion of the plurality of metal ions comprising the chelates within the precursor solution, and a>0, b>0.

19. The method of claim 18 where the solvent is water, the polymerizing agent is a polyhydroxyl alcohol, and the chelating agent is a hydroxycarboxylic acid.

20. The method of claim 19 where the first temperature is from about 100° C. to about 300° C., and where the second temperature is from about 300° C. to about 700° C., and where the third temperature is from about 700° C. to about 1000° C.

* * * * *